United States Patent
Mihály et al.

(10) Patent No.: US 9,668,293 B2
(45) Date of Patent: May 30, 2017

(54) RELOCATION OF MOBILITY ANCHOR FOR NOMADIC SUBSCRIBERS

(75) Inventors: Attila Mihály, Dunakeszi (HU);
András Császár, Budapest (HU);
Christian Gotare, Getinge (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 654 days.

(21) Appl. No.: 13/391,758

(22) PCT Filed: Aug. 25, 2009

(86) PCT No.: PCT/SE2009/050954
§ 371 (c)(1),
(2), (4) Date: May 7, 2012

(87) PCT Pub. No.: WO2011/025422
PCT Pub. Date: Mar. 3, 2011

(65) Prior Publication Data
US 2012/0214492 A1    Aug. 23, 2012

(51) Int. Cl.
*H04W 36/12* (2009.01)
*H04W 76/04* (2009.01)
*H04W 92/14* (2009.01)
*H04W 92/24* (2009.01)

(52) U.S. Cl.
CPC .......... *H04W 76/041* (2013.01); *H04W 36/12* (2013.01); *H04W 92/14* (2013.01); *H04W 92/24* (2013.01)

(58) Field of Classification Search
CPC ..... H04W 36/12; H04W 36/14; H04W 36/24; H04W 36/26; H04W 36/28; H04W 36/30
See application file for complete search history.

(56) References Cited

U.S. PATENT DOCUMENTS

2001/0019544 A1* 9/2001 Bakke et al. ............. 370/331
2003/0169712 A1* 9/2003 Tsao ......................... 370/338
2007/0064686 A1   3/2007 Bae et al.
(Continued)

FOREIGN PATENT DOCUMENTS

CN    101228747 A    7/2008
WO    2007129045 A1  11/2007
(Continued)

OTHER PUBLICATIONS

3rd Generation Partnership Project. "AGW relocation in LTE_ACTIVE." 3GPP TSG-RAN WG3 meeting #51bis. R3-060424. Sophia Antipolis, France. Apr. 3-5, 2006.
(Continued)

*Primary Examiner* — Mazda Sabouri
(74) *Attorney, Agent, or Firm* — Coats and Bennett, PLLC (57) ABSTRACT

A method, a mobility node 211 and a new mobility anchor 214b configured to operatively relocate the mobility anchor 214a for a mobile terminal 215a in a wireless communication system 200. The relocation is achieved by a request for redirecting an old bearer B-old configured to communicate user-data between the mobile terminal 215a and an old mobility anchor 214a, and by setting up a new standby bearer B-new configured to operatively communicate user-data between the Mobile Terminal 215a and the new mobility anchor 214b. The standby bearer B-old is ready to be activated once the old bearer B-old is deleted.

16 Claims, 6 Drawing Sheets

(56) References Cited

U.S. PATENT DOCUMENTS

| | | | |
|---|---|---|---|
| 2007/0248064 A1* | 10/2007 | Shaheen | 370/338 |
| 2008/0031159 A1* | 2/2008 | Jokinen | 370/255 |
| 2008/0259873 A1 | 10/2008 | Ahmavaara et al. | |
| 2008/0316972 A1* | 12/2008 | Shaheen | 370/331 |
| 2009/0061855 A1 | 3/2009 | Sethi et al. | |
| 2009/0213762 A1* | 8/2009 | Guo et al. | 370/254 |
| 2010/0067400 A1* | 3/2010 | Dolganow et al. | 370/253 |
| 2010/0323700 A1* | 12/2010 | Bachmann et al. | 455/436 |
| 2011/0299477 A1* | 12/2011 | Nikander et al. | 370/329 |
| 2012/0020347 A1* | 1/2012 | De Vega De La Red | 370/338 |
| 2012/0202491 A1* | 8/2012 | Fox et al. | 455/435.1 |

FOREIGN PATENT DOCUMENTS

| | | |
|---|---|---|
| WO | WO2007144762 A2 | 12/2007 |
| WO | 2009092440 A1 | 7/2009 |
| WO | 2010115459 A1 | 10/2010 |

OTHER PUBLICATIONS

3rd Generation Partnership Project. "MME/UPE Relocation based on TAU." 3GPP TSG SA WG2 Architecture—SAE Ad-Hoc. S2-062705. Sophia Antipolis, France. Aug. 23-26, 2006.

Taaghol, et al. "Seamless Integration of Mobile WiMAX in 3GPP Networks." IEEE Communications Magazine, Oct. 2008, vol. 46, No. 10. pp. 74-85. IEEE, Pisacataway, NJ.

González, M. et al., "Understanding individual human mobility patterns", nature Letters, Jun. 5, 2008, pp. 779-782, vol. 453, doi: 10/1038/nature06958, Nature Publishing Group.

\* cited by examiner

RELOCATION OF MOBILITY ANCHOR FOR NOMADIC SUBSCRIBERS

TECHNICAL FIELD

The invention described herein relates to communication between nodes in wireless communication systems. Embodiments of the invention relate to relocation of anchor nodes in wireless communication systems. Particular embodiments of the invention relate to nodes in wireless communication systems.

BACKGROUND OF THE INVENTION

Mobility in connection with wireless communication networks is usually a precondition. The ability to move within a wireless network and/or between various wireless networks is particularly desirable in connection with movable subscribers in the form of wireless mobile terminals or similar, e.g. such as cell phones or similar communication devices, or such as laptops or similar computer devices provided with wireless communication ability, e.g. equipment for communication with Wireless Local Area Networks (WLAN, e.g. WiFi), or equipment for communication Worldwide Interoperability for Microwave Access networks (WiMAX networks, based on IEEE 802.16), or equipment for communication with General Packet Radio Service system (GPRS system based on 3GPP specifications), or Universal Mobile Telecommunication System (UMTS, based on 3GPP specifications) or enhancements of the UMTS such as the Long Term Evolution (LTE) or similar.

Traditionally, upon attachment of a wireless mobile terminal to an access point, e.g. such as a base station or similar of a wireless communication system, the system selects a gateway as the point of presence for that terminal. Once the terminal is attached it can be reached by other peers or similar via the IP address or similar of this gateway. In addition, the terminal may also reach other peers or similar via the IP address or similar of this gateway. For example, in GPRS this gateway is the Gateway GPRS Support Node (GGSN) and in LTE this gateway is the Public Data Network Gateway (PDN Gateway or simply P-GW).

The gateway now mentioned can be seen as a mobility anchor for the mobile terminal, since it is maintained as the point of presence even if the terminal moves away to other access points, i.e. the terminal can always be reached via the IP address or similar of the IP anchor even if the terminal moves and changes its point of attachment to the wireless communication system. Indeed, the terminal remains anchored to the initial gateway, even if the movement means a relatively long distance. This kind of mobility anchors is well known in the art and they need no further description. Various mobility anchors are e.g. frequently used in connection with IPv4 and IPv6.

If the anchor is far away from the mobile terminal, it may require considerable transport usage to get traffic to/from the terminal, especially in the frequent case when the mobile terminal communicates with geographically close peers or similar partners. This waste of transport resources is called the tromboning effect.

Figure 1:
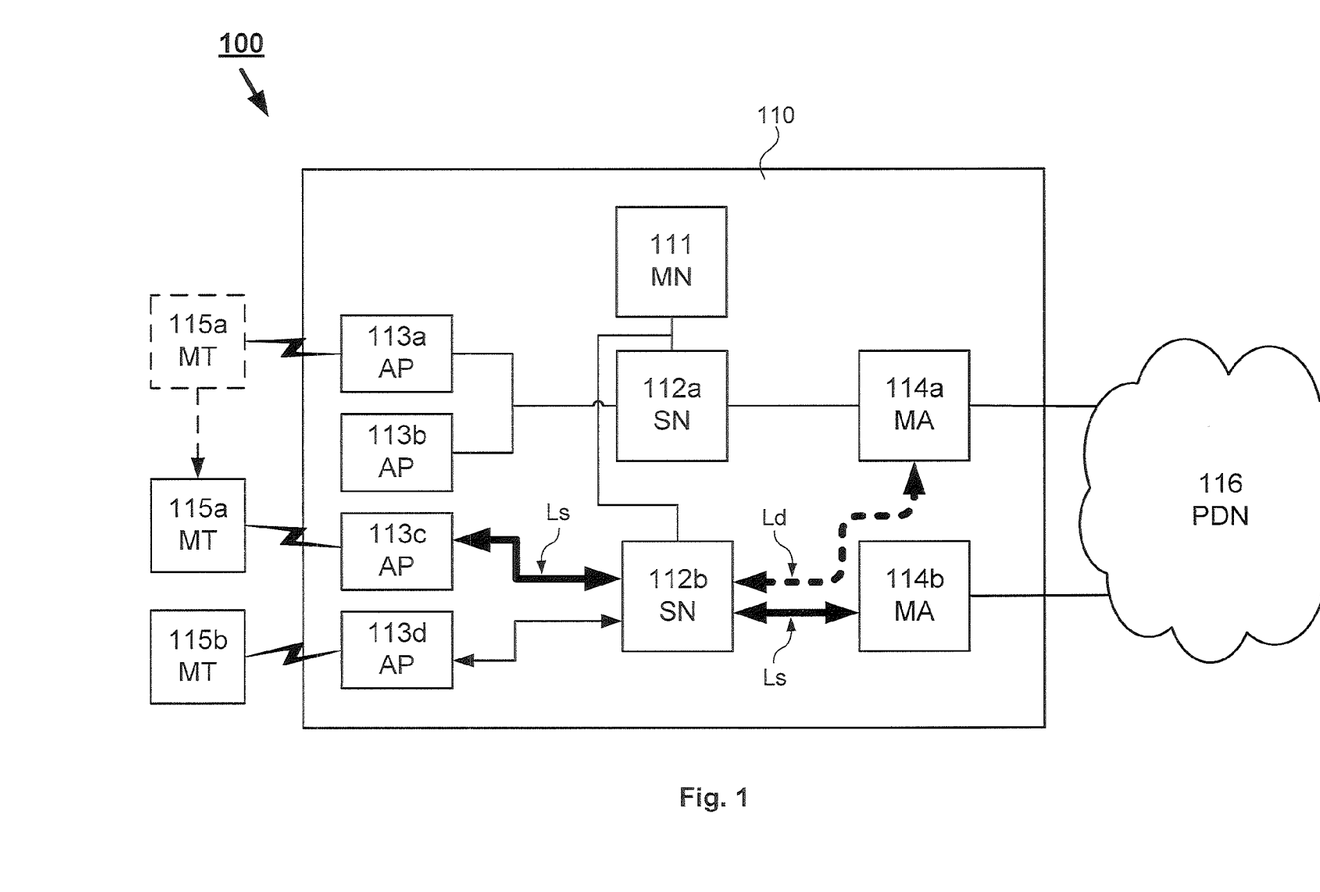
FIG. 1 is a schematic illustration an exemplifying wireless communication system 100.

The tromboning effect is clarified with respect to FIG. 1 illustrating an exemplifying wireless communication system 100. The exemplifying system 100 comprises a plurality of Mobile Terminals 115a, 115b and a Packet System 110. The Packet System 110 comprises at least one Mobility Node Arrangement 111, a plurality of Serving Nodes 112a, 112b, a plurality of Access Points 113a, 113b, 113c, 113d and a plurality of Mobility Anchors 114a, 114b. The Mobility Anchors 114a, 114b may e.g. be gateway nodes. The lines and arrows or similar connecting the different devices, nodes or similar arrangements of the Packet system 110 in FIG. 1 intend to illustrate connectivity between these arrangements. For example, the Packet System 110 is configured to communicate with the Mobile Terminals 115a, 115b via a radio interface. The arrangements 111, 112a, 112b, 113a, 113b, 113c, 113d, 114a, 114b within the Packet System 110 are preferably configured to communicate with each other by means of data packets, e.g. such as IP packets or similar.

The wireless communication system 100 is a general representation of more particular wireless communication systems, e.g. such a GPRS system or a LTE system. Thus the Access Points corresponds to the LTE eNB and the GPRS Node B, the Mobile Terminals corresponds to the LTE UE and the GPRS Mobile Station (MS), the Mobility Node correspond to the LTE MME and the GPRS Mobile Switching Center (MSC), the Serving Nodes correspond to the LTE S-GW and the GPRS SGSN, and the Mobility Anchors corresponds to the LTE P-GW and the GPRS GGSN.

Wireless communication systems as the system 100 in FIG. 1 are well known to those skilled in the art and they need no detailed explanation. Nevertheless, a brief overview of the arrangements in the system 100 will be given below.

The Access Points 113a-113d of the Packet System 110 is usually transceivers configured to communicate data packets via a wireless radio interface between the Mobile Terminals 115a, 115b and the Packet System 110.

The Mobile Terminals 115a, 115b may be any device used directly by a user to communicate with an Access Point 113a-133d. It can be a hand-held telephone, a card in a laptop computer or any other device that is configured to connect to an Access Point 113a-113d. It is assumed that the Mobile Terminals 115a, 115b moves substantially freely around the Access Points 113a-113d. It is also assumed that the Mobile Terminals 115a, 115b communicate via the Packet System 110 and the Access Points 113a-113d, i.e. the Mobile Terminals 115a, 115b do not communicate directly with each other.

The Mobility Node 111 manages the mobility functions in the communication system 100. For example, assume that a Mobile Terminal 115a moves from a first access point 113a to a second access point 113b as illustrated by dashed lines in FIG. 1. The Mobility Node 111 will then manage a transfer or a handover or similar from access point 113a to access point 113c such that the services and/or context etc associated with the Mobile Terminal 115a is now provided via access point 113c. In particular, the Mobility Node 111 is configured to manage user-data bearers Ld, Ls (to be explained further later) for communicating user-data of a Mobile Terminal 115a, 115b between a Serving Node 112a, 112b and a Mobility Anchor 114a, 114b.

The Serving Nodes 112a, 112b are configured to communicate user-data for a Mobile Terminal 115a, 115b between a Mobility Anchors 114a, 114b and an Access Point 113a-113d. The Serving Nodes 112a, 112b gets orders from the Mobility Node 111 to establish, modify and release bearers between the Serving Nodes 112a, 112b on one hand and the Access Points 113a-113d respectively on the other hand, but also between the Serving Nodes 112a, 112b on one hand and the Mobility Anchors 114a, 114b respectively on the other hand.

The Mobility Anchors 114a, 114b are preferably the interfaces between the internal IP network of the Packet System 110 and various external IP networks such as the Internet or similar Public Data Networks (PDNs) 116.

FIG. 1 intends to illustrate the movement of a mobile terminal over a long distance in that the Mobile Terminal 115a has moved from the first access point 113a to the second Access Point 113b as illustrated by dashed lines.

Now, assume that the Mobile Terminal 115a was anchored at the first Mobility Anchor 114a. It will then remain anchored at the first Mobility Anchor 114a, even if the new position at the second Access Point 113c would make it more beneficial to anchor the terminal at a second Mobility Anchor 114b being locally arranged with respect to the second access point and/or the Serving Node 112b serving the second Access Point 112b so as to enable a local flow of user-data. For example, this may be the case if the first Mobile Terminal 115a communicates with a second Mobile Terminal 115b being anchored at the assumedly local second Mobility Anchor 114b as shown in FIG. 1. However, since the distant first Mobility Anchor 114a is still the anchor of the first Mobile Terminal 115a the flow of user-data between the Mobile Terminals 115a and 115b will pass through the distant first Mobility Anchor 114a and not through the local second Mobility Anchor 114b as would be preferred.

The preferred local flow of user-data between the second Mobility Anchor 114b and the second Serving Node 112b has been indicated by a solid line Ls in FIG. 1 (c.f. B-new in FIG. 2). The distant flow of user-data between the first Mobility Anchor 114a and the second Serving Node 112b has been indicated by dashed line Ld in FIG. 1 (c.f. B-old in FIG. 2).

The flow of user-data through a distant path instead of an alternative local path causes a so-called tromboning effect as previously mentioned.

One way of mitigating the tromboning effect may be to detach the Mobile Terminal 115a from the Access Point 113c and the Packet System 110 and then re-attaching it to the same Access Point 113c again while selecting a new anchor in the form of the second Mobility Anchor 114b that is more suitably located in the Packet System 110.

However, simply detaching the Mobile Terminal 115a and then attach it again means that its context will potentially be lost resulting in a large number of signalling to update the charging system, re-authenticate the Mobile Terminal, infer terminal type, setup policy settings etc. In addition, detaching implies a relatively long outage time, which means that session continuity for the Mobile Terminal 115a can not be guaranteed. This is typically not acceptable since session continuity is a fundamental principle in many modern wireless communication systems, e.g. such as the LTE systems and other systems according to the 3GPP specifications. In other words, this solution cannot be applied in case session continuity is to be guaranteed for a given terminal.

Hence, there is a need for an improved solution that relocates an anchor while mitigating or avoiding one or several of the disadvantages touched upon above.

SUMMARY OF THE INVENTION

At least one of the disadvantages touched upon above is eliminated or at least mitigated by a method for relocating the mobility anchor for a mobile terminal in a wireless communication system. The method is performed in a new mobility anchor. Moreover, the method comprises the steps of receiving from a mobility node a request for redirecting an old bearer configured to communicate user-data between the mobile terminal and an old mobility anchor. In addition, the method comprises the steps of setting up a new standby bearer configured to operatively communicate user-data between the mobile terminal and the new mobility anchor. The standby bearer is configured and ready to be operatively activated once the old bearer is deleted.

The old bearer and the new bearer may be default bearers. However, the invention is equally applicable for other bearers such as dedicated bearers or similar.

The new standby bearer is preferably created while the mobile terminal is continuously attached to the wireless communication system.

It is preferred that the new standby bearer is setup while the old bearer is still active.

It is preferred that the new mobility node receives bearer states for the old bearer from the old mobility anchor. It is also preferred that the bearer states for the new bearer are setup so as to be substantially the same as the bearer states for the old bearer.

In addition, at least one of the disadvantages touch upon above is eliminated or at least mitigated by a new mobility anchor configured to operatively communicate user-data of a mobile terminal. The new mobility anchor is further configured to operatively receive from a mobility node a request for redirecting an old bearer configured to communicate user-data between the mobile terminal and an old mobility anchor. The new mobility anchor is also configured to setup a new standby bearer configured to operatively communicate user-data between the mobile terminal and the new mobility anchor. The new standby bearer is configured to be operatively ready to be activated once the old bearer is deleted.

Moreover, at least one of the disadvantages touch upon above is eliminated or at least mitigated by mobility node arrangement configured to manage bearers for a mobile terminal. The mobility node arrangement is configured to operatively transmit a request for relocation of mobility anchor for the mobile terminal from an old mobility anchor to a new mobility anchor, so as to enable the setup of a new standby bearer configured to operatively communicate user-data between the mobile terminal and the new mobility anchor. The new standby bearer is configured to be operatively ready to be activated once the old bearer is deleted.

The mobility node is preferably configured to operatively transmit a request for deletion of the old bearer when the mobile terminal is more locally positioned with respect to the new mobility anchor than with respect to the old mobility node.

The mobility node is preferably configured to operatively transmit the request for relocation while the old bearer is still active.

The mobility node is preferably configured to operatively withhold the request for activating the new bearer until there is no active service communicating user-data for the mobile terminal.

Further advantages of the present invention and embodiments thereof will appear from the following detailed description of embodiment the invention.

It should be emphasized that the term "comprises/comprising" or similar when used in this specification is taken to specify the presence of stated features, integers, steps or components or similar, but does not preclude the presence or addition of one or more other features, integers, steps, components or groups thereof or similar.

Similarly, the steps of the exemplifying methods described herein must not necessarily be executed in the order in which they appear. In addition, embodiments of the exemplifying methods described herein may comprise more or less steps without departing from the scope of the present invention.

DETAILED DESCRIPTION

Embodiments of the present invention may be implemented in the general exemplifying wireless communication system 100 of FIG. 1. More particular embodiments of the present invention may be implemented in a LTE system or in a GPRS system or similar. Below, the structure of an embodiment is described with reference to a LTE system 200 shown in FIG. 2.

Structure of an Embodiment of the Invention

Figure 2:
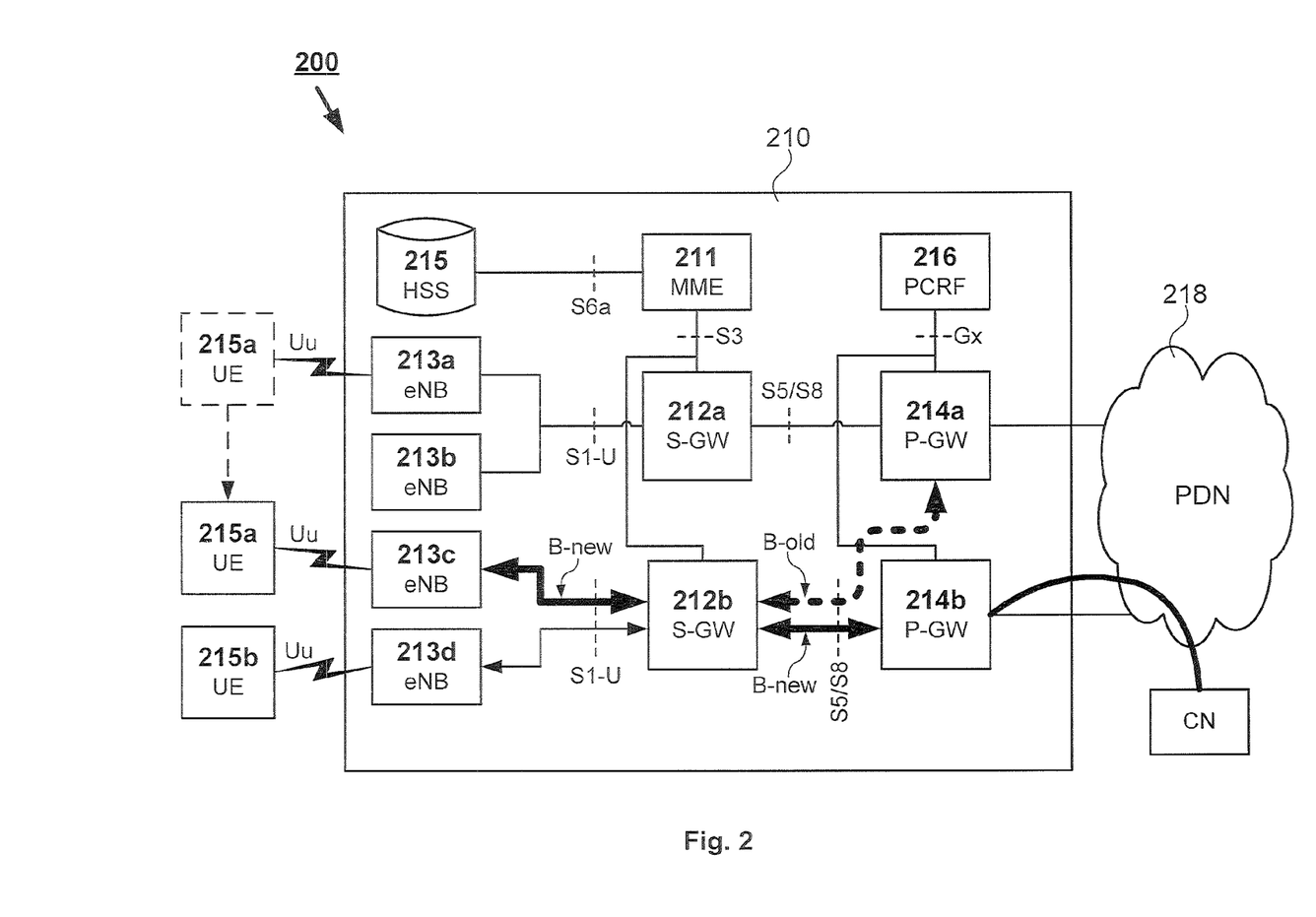
FIG. 2 is a schematic illustration an exemplifying wireless communication system in the form of a LTE system 200.

FIG. 2 illustrates an exemplifying LTE system 200 comprising a plurality of User Equipments (UE) 215a-215b and an Evolved Packet System (EPS) 210. The EPS 210 comprises at least one Home Subscriber Server (HSS) 215, possibly at least one Policy and Charging Rules Function (PCRF) 216, at least one Mobility Management Entity (MME) 211, a plurality of Serving Gateways (S-GW) 212a-212b, a plurality of enhanced Node B (eNB) 213a-213d and a plurality of PDN Gateways (P-GW) 214a-214b. It may be added that the so called Evolved Packet Core (EPC) of the LTE system 200 comprises the MME 211, the S-GW(s) 212a-212b and the P-GW(s) 214a-214b.

The exemplifying LTE system 200 in FIG. 2 is well known to those skilled in the art and it needs no detailed description. However, a short explanation will be given below of the components in the exemplifying LTE system 200 being relevant to embodiments of the present invention.

The enhanced Node B (eNB) 213a, 213b, 213c, 213d is an access point or similar configured to communicate with the UE:s 215a, 215b via a wireless radio interface Uu. The UE 215a, 215b may be any device used by a user to communicate with the EPS 210. The UE may e.g. be a hand-held telephone, a card in a laptop computer, or any other device that is configured to connect to the eNBs of the EPS.

The Mobility Management Entity (MME) 211 is responsible for the overall mobility in the LTE system 200. When a UE 215a, 215b registers, the MME 211 will request subscriber data from the HSS 215 and perform an authentication of the UE 215a, 215b. The MME 211 will also take care of signalling to and from the UE 215a, 215b by means of two different signalling protocols. This is commonly referred to as Non Access Stratum (NAS) signalling. When new bearers are to be established or existing bearers are modified, it will communicate this with the S-GW 212a, 212b. The bearers are commonly referred to as EPS bearers, wherein EPS stands for Evolved Packet System. In particular, the MME 211 is configured to manage user-data bearers B-old, B-new (to be explained further later) for communicating user-data of a UE 215a, 215b between a S-GW 212a, 212b and a P-GW 214a, 214b. When a UE 215a, 215b is registered to an MME 211, it will handle all paging functions and mobility management functions (tracking area updates etc). If a UE 215a, 215b registers in a foreign network, the MME or similar that is located in that network will obtain subscriber data from the HSS in the home network. This is referred to as roaming functions.

The main task of the S-GW 212a, 212b is to tunnel user-data between a P-GW 214a, 214b and an eNB 213a-213d. In addition, the S-GW 212a, 212b is the node in the EPS 210 that charges user-data and takes care of accounting functions (charging between operators). The S-GW 212a, 212b will get orders from the MME 211 to establish, modify and release EPS bearers.

The P-GW 214a, 214b is the interface between the internal IP network of the EPS 210 and various external Public Data Networks (PDN) 218, e.g. various IP networks such as the Internet or similar. It may be added that a S-GW and a P-GW can be combined and co-located in the same or neighbouring hardware as a matter of implementation for vendors of core networks. The P-GW 214a, 214b is also the so called policy and charging enforcement point. The main principle is that policy and charging function verifies whether the UE 215a, 215b only sends data according to what it has requested and is allowed. The policies are transferred from the PCRF 216 to the P-GW 214a, 214b which then acts as a Policy and Charging Enforcement Function (PCEF) so as to perform packet filtering (for example, by removing not accepted packets).

With respect to the PCRF 216 it can be noted that there are two separate so called planes in most modern networks; one control plane and one user plane. The IP Multimedia Subsystem (IMS) for example, belongs to the control plane and a UE 215a, 215b will request services from the IMS system. When services are accepted, some function in the user plane such as a PCEF or similar must supervise that users only send the correct amount of data to the correct destination. This means that the control layer will indicate what a user is allowed to do and it is the task of the PCRF 216 to create rules for this. This is referred to as a "policy". In addition to this, the PCRF 216 will also create charging rules and send this information to the P-GW 214a, 214b.

As a matter of clarification it should be explained that the lines and arrows or similar connecting the different nodes or equipments and similar arrangements in FIG. 2 are intended to illustrate connectivity between these arrangements. The dashed lines labelled S1-U, S3, S5/S8, S6a and Gx respectively are in correspondence with the 3GPP specifications intended to illustrate that logical interfaces with the corresponding names are used for communication between said arrangements by means of said connectivity.

Function of a Packet System According to a First Embodiment of the Invention

Figure 3:
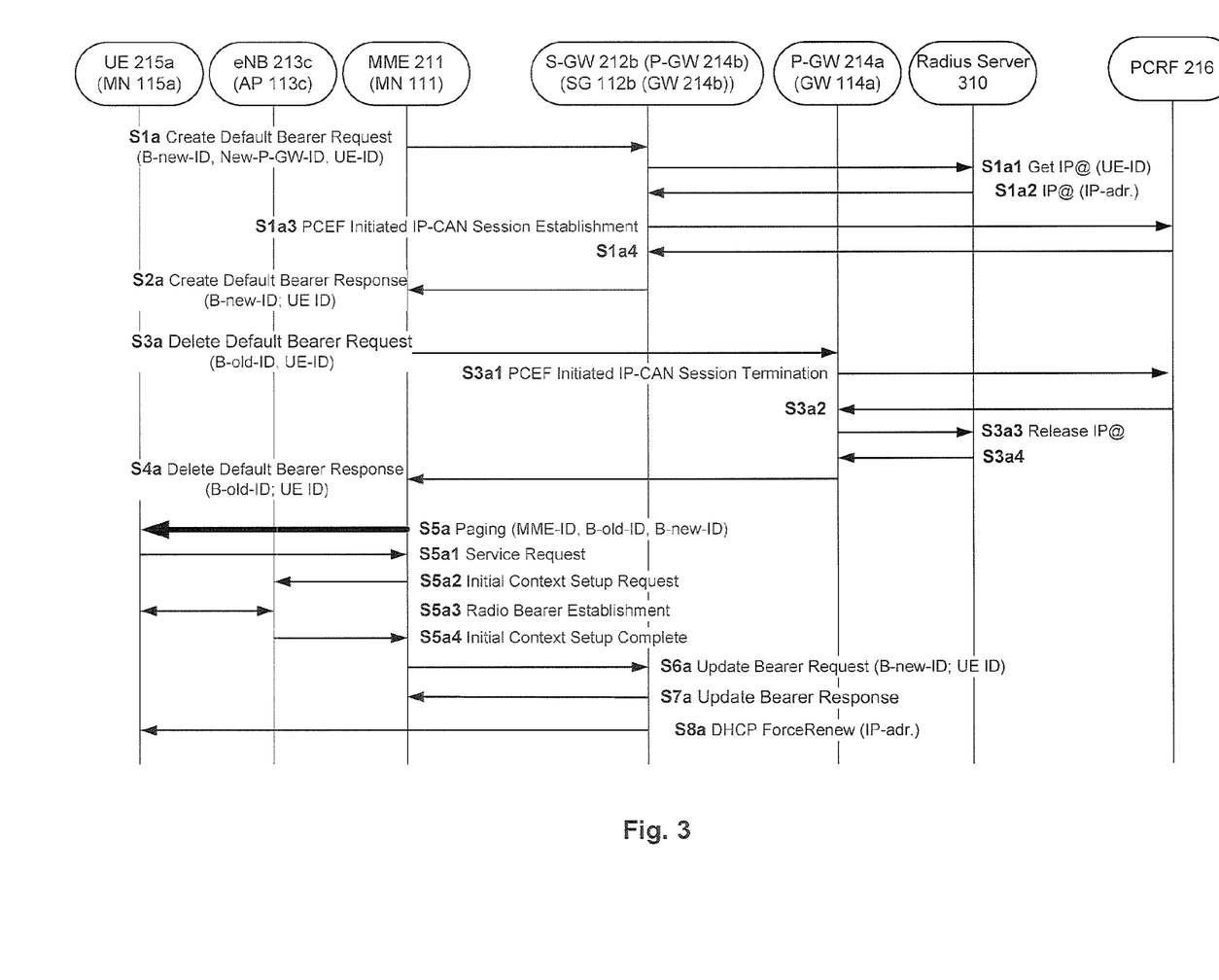
FIG. 3 is a schematic illustration of a sequence diagram illustrating the operational steps of a first embodiment of the present invention.
Figure 4:
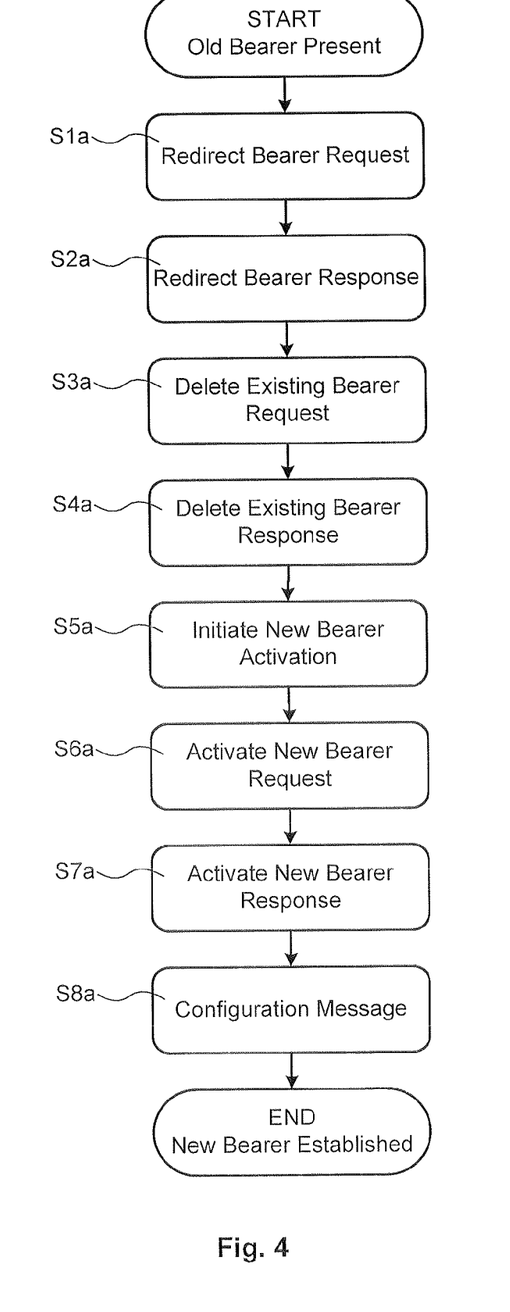
FIG. 4 is a flowchart illustrating the operational steps of the embodiment in FIG. 3.

The operation of the exemplifying LTE system 200 shown in FIG. 2 will now be described with reference to FIG. 3 showing a sequence diagram illustrating the steps of a first embodiment of the present invention and with reference to FIG. 4 showing a flowchart illustrating the steps of the same embodiment.

Before we proceed it should be emphasised that the nodes and similar in the EPC 210 are communicating via a packet data network, meaning that any node or similar may address any other node or similar by using the appropriate IP address or similar. For example, communication between the MME 211 and the P-GWs 214a, 214b may occur via the S-GWs 212a, 212b respectively or in any other suitable manner using the structure of the internal data packet network of the EPS 200 or similar.

It is assumed that the LTE system 200 or at least the EPS 210 is activated so as to be operative. It is also assumed that a first UE 215a originally anchored at a first P-GW 214a has now moved from a first eNB 213a served by a first S-GW 212a to a second eNB 213c served by a second S-GW 212b. It is further assumed that the first S-GW 212a is locally arranged with respect to the first P-GW 212a, whereas the second S-GW 212b is locally arranged with respect to a second P-GW 214b.

The expression "locally arranged" may e.g. imply that the S-GW and the P-GW in question are co-located within the same or neighboring hardware, or that they are otherwise closely arranged with respect to each other, e.g. in terms of geographical area or similar, or in terms of roundtrip delay or similar and/or in terms of communication capacity (e.g. Mbit/s) or similar.

It is also assumed that the bearer B-old is established between the first P-GW 214a and the second S-GW 212b serving the second eNB 213c to which the UE 215a is now attached. This is required for enabling communication with the UE 215a still being anchored at the first P-GW 214a. The bearer B-old is configured to communicate user-data for the first UE 215a. The bearer B-old may e.g. be implemented by means of an S5a interface as outlined in the 3GPP specifications. Typically, IP tunnels or similar may be used for implementing the bearer B-old. Further, it assumed that the bearer B-old is associated with a bearer identification B-old-ID known to the EPS 210 and the MME 211 and also by the S-GW 212b and the P-GW 214a.

Before we proceed it should be noted that the S-GW 212b and the P-GW 214b the first embodiment now described are co-located in the same hardware or similar with the effect that they are addressed as a single node. The signalling between the S-GW 212b and the P-GW 214b may therefore be performed internally within this node according to a vendor specific scheme. The communication between the S-GW 212b and the P-GW 214b has therefore been omitted in FIG. 3.

In a first step S1a it is preferred that the MME 211 prepares a relocation of the IP anchor for the UE 215a. The MME 211 may e.g. decide to prepare a relocation of IP anchor if the new S-GW 212b is more locally positioned with respect to the new P-GW 214b than with respect to the old P-GW 214a. The MME 211 may e.g. detect this by obtaining and/or being provided with knowledge of whether the new S-GW 212b and the new P-GW 214b are co-located in the same or neighboring hardware, and/or knowledge of the geographical location or similar of the new S-GW 212b, the old P-GW 214a and the new P-GW 214b, and/or knowledge of the roundtrip delay or similar and/or the communication capacity or similar (e.g. Mbit/s) between the new S-GW 212b and the old P-GW 214a on one hand and the new S-GW 212b and the new P-GW 214b on the other. A suitable occasion for detecting and/or deciding whether a relocation should be prepared or not may e.g. be when the serving gateway for the UE 215a changes from a first serving gateway to a second serving gateway, e.g. changes from S-GW121a to S-GW 212b.

Since we have assumed that the S-GW 212b and the P-GW 214b are co-located in this embodiment it is preferred the MME 211 concludes that a relocation of mobility anchor from the old P-GW 214a to the new co-located S-GW 212b, P-GW 214b should be made for the UE 215a.

Thus, a preparation of anchor relocation for the UE 215a in step S1a is preferably initiated by the MME 211 sending a request for initiating a relocation of mobility anchor for the UE 215a from the old anchor P-GW 214a to the new co-located anchor S-GW 214b, P-GW 214b. More particularly, this is preferably initiated by the MME 211 sending a prepare bearer request or similar to the new co-located mobility anchor S-GW 212b, P-GW 214b for setting up a new bearer B-new for the UE 215a between the UE 215a and the co-located S-GW 212b, P-GW 214b. The prepare bearer request may be seen as a request for redirecting the old bearer B-old, which e.g. may be a Create Default Bearer Request as illustrated in FIG. 3.

Preferably, both the new bearer B-new and the old bearer B-old are default bearers. Typically, a default bearer is the first bearer that is set up when the UE 215a attaches to the EPS 210. The UE 215a has only one active default bearer. The default bearer provides the basic connectivity between the UE 215a and the EPS 210. Preferably, the default bearer is a non-GBR bearer, i.e. a non Guarantied Bit-Rate bearer. In addition, the UE 215a may have one or more dedicated bearers.

Generally, the prepare bearer request may e.g. comprise information indicative of at least one of: the identity B-new-ID of the new bearer B-new to be setup and/or the identity New-P-GW-ID of the new co-located anchor S-GW 212b, P-GW 214b (e.g. its IP address or similar), and/or the identity of the UE-ID of the UE 215a (e.g. its IP-address or similar) for which the anchor relocation is preformed. The information enables the S-GW 212b to identify the co-located S-GW 212b, P-GW 214b and/or the UE 215 and/or the new bearer B-new to be setup. The information received in step S1a may be generally used for activating the new bearer B-new as will be described in step S6a below.

More particularly, in connection with the LTE system 200 as shown in FIG. 2 it is preferred that the request is a Created Default Bearer Request being made in accordance with the 3GPP specification TS 23.401-860 or similar, see e.g. Fig. 5.3.2.1-1 therein. Here the MME 211 selects the new S-GW 212b and allocates an EPS Bearer Identity (e.g. B-new-ID) for the Default Bearer associated with the UE 215a. Then it sends a Create Default Bearer Request message to the selected S-GW 212b. The Create Default Bearer Request within an LTE system 200 may, in addition to and/or as an alternative to the general information mentioned above, comprise one or several of: IMSI, MSISDN, MME TEID for control plane, PDN GW address, PDN Address, APN, RAT type, Default EPS Bearer QoS, PDN Type, APN-AMBR, EPS Bearer Identity, Protocol Configuration Options, Handover Indication, ME Identity, User Location Information (ECGI), MS Info Change Reporting support indication, Selection Mode, Charging Characteristics, Trace Reference, Trace Type, Trigger Id, OMC Identity, Maximum APN Restriction, Dual Address Bearer Flag, the Protocol Type over S5/S8. The S-GW 212b may create a new entry in an EPS Bearer table associated with the S-GW 212b. The abbreviations above are those generally used by the 3GPP, see e.g. the specification TR 21.905 V9.2.0 (2009-06).

In the subsequent steps S1a1-S1a2 it is preferred that the co-located S-GW 212b, P-GW 214b allocates a new IP address for the UE 215a The allocation of an IP address may e.g. be done by the co-located S-GW 212b, P-GW 214b requesting a RADIUS server 310 (Remote Authentication Dial In User Service) or similar to provide a new IP address for the UE 215a. The RADIUS server may then respond and provide the S-GW 212b, P-GW 214b with a new IP address for the UE 215a.

The new IP address may e.g. be provided in an access accept sent from the RADIUS server. The use of RADIUS servers is well known per se by those skilled in the art and it needs no further description. However, it may be clarified that a RADIUS server may be perceived as a client/server protocol that runs in the application layer for the purpose of authenticate and authorize UE:s and to account for usage of services made available after the authentication and authorization. The allocation of a new IP address for the UE 215a may alternatively be accomplished by the S-GW 212b or the P-GW 214b or the co-located S-GW 212b, P-GW 214b selecting from a pool of IP addresses or similar being available to it.

In possible further subsequent steps S1a3-S1a4 it is preferred that a request for an IP-CAN Session Establishment procedure or similar is sent by the co-located S-GW 212b, P-GW 214b to the PCRF 216 (step S1a3) and a corresponding response is received from the PCRF 216 (step S1a4) by the co-located S-GW 212b, P-GW 214b. Generally, the IP-CAN Session Establishment procedure establishes the policy and/or charging rules or similar for the new bearer B-new requested in step S1a above. In particular, the IP-CAN Session Establishment procedure may e.g. be performed according to the 3GPP specification TS 23.203 or similar. Thus, the IP-CAN Session Establishment procedure according to steps S1a3, S1a4 may e.g. obtain the default FCC rules for the UE 215a, If available to the S-GW 212b, P-GW 214b, the IMSI, UE IP address, User Location Information (ECGI), Serving Network, RAT type, APN-AMBR, Default EPS Bearer QoS may be sent to the PCRF 216 by the S-GW 212b if received in step S1a. The abbreviations used above are those generally used by the 3GPP, see e.g. the specification TR 21.905 V9.2.0 (2009-06).

Steps S1a3-S1a4 now described may be omitted in some embodiments. This may e.g. be the case when the old P-GW 214a uses non-dynamic policy and/or charging rules or similar for the UE 215a, i.e. permanent and/or pre-set policy and/or charging rules or similar. Non-dynamic policy and/or charging rules or similar may e.g. be pre-stored in the co-located S-GW 212b, P-GW 214b.

In a second step S2a it is preferred that the co-located S-GW 212b, P-GW 214b sends a Create Default Bearer Response message or similar to the MME 211 confirming that a new bearer B-new has been setup or will be setup shortly.

Generally, the create bearer response message may e.g. comprise information indicative of the identity UE-ID of the UE 215a and/or the identity B-new-ID of the new bearer B-new. The information enables the MME 211 to identify the new bearer B-new and/or the UE 215.

More particularly, in connection with the LTE system 200 as shown in FIG. 2 it is preferred that the response is done in accordance with the 3GPP specification TS 23.401-860 or similar, see e.g. Fig. 5.3.2.1-1 therein. Here, the Create Default Bearer Response message to the MME 211 may, in addition to and/or as an alternative to the general information mentioned above, comprise one or several of: PDN Type, PDN Address, Serving GW address for User Plane, Serving GW TEID for User Plane, Serving GW TEID for control plane, EPS Bearer Identity, EPS Bearer QoS, PDN GW addresses and TEIDs (GTP-based S5/S8) or GRE keys (PMIP-based S5/S8) at the PDN GW(s), Protocol Configuration Options, Charging Id, Prohibit Payload Compression, APN Restriction, Cause, MS Info Change Reporting Action (Start), APN-AMBR. The abbreviations above are those generally used by the 3GPP, see e.g. the specification TR 21.905 V9.2.0 (2009-06).

The performance of the above steps S1a and S2a—possibly including the subsequent steps S1a1-S1a4—means that the properties of the new bearer B-new have now been setup so as to enable a future communication of user-data between the UE 215a and the new co-located anchor S-GW 212b, P-GW 214b once the new bearer B-new has been activated. The setup of the new bearer B-new is done while the old bearer B-old is still active for communicating user-data for the UE 215a. In other words, the new bearer B-new is setup without affecting the communication of user-data for the UE 215a via the old bearer B-old. Thus, a significant amount of signalling for the IP anchor relocation of the UE 215a is done while user-data is still communicated via the old bearer B-old. Consequently, there is a lesser amount of relocation signalling left that may affect the communication of user-data, which e.g. implies that the outage time for the UE 215a can be kept to a minimum. This also implies that a new bearer B-new may be prepared by the MME 211 as a precautionary measure, e.g. in case tromboning may be expected. In fact, the co-located S-GW 212b, P-GW 214b will be a new standby mobility anchor for the UE 215a with a new standby bearer B-new setup for the UE 215a ready to be activated once the existing bearer B-old is removed (e.g. deleted), thus phasing out the existing mobility anchor 214a. The MME 211 can then wait for a suitable occasion to relocate from the old bearer B-old to the new bearer B-new. Indeed, the MME 211 may even delete the new bearer B-new if the need for a relocation ceases before said suitable occasion, e.g. in case no harmful tromboning can be detected.

A suitable occasion for activating the relocation of the new mobility anchor of the UE 215a may e.g. occur when there is no active service communicating user-data for the UE 215a, e.g. an active service in the form of a best-effort service, a voice service, a video conference service or a streamed service or similar) provided by the UE 215a.

Now, since the old bearer B-old still exists and user-data for the UE 215a is still communicated via this bearer, a relocation of the P anchor and the communication paths for the UE 215a requires that the old bearer B-old is deleted before the new bearer B-new can be activated.

Hence, a deletion of the old bearer B-old will now be described with reference to steps S3a and S4a. In addition, possible subsequent steps S3a1, S3a2, S3a3 and S3a4 may also be performed as will also be described below. The activation of the new bearer B-new for communicating user-data will then be described in steps S6a, S7a and S8a below.

Thus, in a third step S3a it is preferred that the MME 211, being the initiator of the setup of a new bearer B-new for the UE 215a in step S1a, concludes that the existing bearer B-old has to be deleted. As a result, the MME 211 preferably sends a Delete Default Bearer Request message or similar message to the old P-GW 214a for deleting the old bearer B-old. However, as already indicated, the request may be sent with some delay from the setup of the new bearer B-new as described above.

Generally, the delete bearer request may e.g. comprise information indicative of the identity UE-ID of the UE 215a and/or the identity B-old-ID of the existing bearer B-old to be deleted. The information enables the old P-GW 214a to identify and delete the existing bearer B-old.

More particularly, in connection with the LTE system 200 as shown in FIG. 2 it is preferred that the delete bearer request is done in accordance with the 3GPP specification TS 23.401-860 or similar, see e.g. Fig. 5.3.8.3-1 therein. Here it is preferred that any EPS Bearer Context information in the co-located S-GW 212b, P-GW 214a regarding this particular UE 215a and related to the MME 211 is deactivated by the MME 211 sending a Delete Default Bearer Request message to the co-located S-GW 212b, P-GW 214b. The request may, in addition to and/or as an alternative to the general information mentioned above, comprise one or several of: the User Location Information IE and/or the Tunnel Endpoint Identity (TEID) for the bearer B-old.

In the possible subsequent steps S3a1-S3a2 it is preferred that a request for an IP-CAN Session Termination procedure or similar is sent to the PCRF 216 (step S3a1) and a corresponding response is received from the PCRF 216 (step S1a4). The request to the PCRF 216 is preferably sent from the P-GW 214a and the response from the PCRF 216 is preferably received by the P-GW 214a. Generally, the IP-CAN Session Termination procedure deletes and/or terminates the policy and/or charging rules for the bearer B-old. In particular, an IP-CAN Session Termination procedure may e.g. be performed according to the 3GPP specification TS 23.203 or similar. The abbreviations above are those generally used by the 3GPP, see e.g. the specification TR 21.905 V9.2.0 (2009-06).

Steps S3a1-S3a2 now described may be omitted in some embodiments. This may e.g. be the case when the old P-GW 214a uses non-dynamic policy and/or charging rules or similar for the UE 215a, i.e. permanent and/or pre-set policy and/or charging rules or similar. Non-dynamic policy and/or charging rules or similar may e.g. be pre-stored in the co-located S-GW 212b, P-GW 214b.

In the possible subsequent steps S3a3-S3a4 it is preferred that the old P-GW 214a releases the IP address that was used by the UE 215a for communicating user-data to the old P-GW 214a via the eNB 213c and the co-located S-GW 212b, P-GW 214b as shown by the thick dashed arrow in FIG. 2. This may e.g. be done by the old P-GW 214a requesting the RADIUS server 310 or similar to release the old IP address for the UE 215a, which RADIUS server may respond to the P-GW 214a confirming that the old IP address has been released or will be released shortly. Alternatively, the request for releasing the old IP address may be directed to the co-located S-GW 212b, P-GW 214b and/or handled by the by the P-GW 214a itself.

In a fourth step S4a it is preferred that the old P-GW 214a sends a Delete Default Bearer Response message or a similar to the MME 211 confirming that the old bearer B-old has been deleted or will be deleted shortly by the old P-GW 214a.

Generally, the delete bearer response message may e.g. comprise information indicative of the identity UE-ID of the UE 215a and/or the identity B-old-ID of the old bearer B-old. The information enables the MME 211 to identify the old bearer B-old and/or the UE 215.

More particularly, in connection with the LTE system 200 as shown in FIG. 2 it is preferred that the response is done in accordance with the 3GPP specification TS 23.401-860 or similar, see e.g. Fig. 5.3.8.3-1 therein. Here, it is preferred that the P-GW 214a acknowledges by sending a Delete Bearer Response (TEID) message to the S-GW 212b. In addition to and/or as an alternative to the general information mentioned above, the response may comprise the Tunnel Endpoint Identity (TEID) for the bearer B-old.

Once the MME 211 has received the Delete Bearer Response or similar in step S4a it knows that the old bearer B-old has been deleted or that it will be deleted shortly. Based on this information the MME 211 can conclude that the old bearer B-old should not be further used for communicating user-data for the UE 215a and that the prepared new bearer B-new should be activated. The activation of the new bearer B-new may e.g. be initiated by the MME 211, e.g. by sending an activation request or similar to the UE 215a.

Thus, according to fifth step S5a the activation may e.g. be initiated by sending a paging message or similar activation message the UE 215a. The activation message may e.g. comprise information indicative of the identity of the MME 211 for enabling the UE 215a to identify the paging MME 211. Additionally or alternatively, the activation request may comprise information indicative of the identity of the old bearer B-old and/or indicative of the identity of the new bearer B-new, e.g. to enable the UE 215a to request the correct bearer for user-data. In connection with the LTE system 200 it is preferred that the paging is done in accordance with the 3GPP specification TS 23.401-860 or similar, see e.g. Fig. 5.3.4.3-1 therein.

In a possible subsequent step S5a1 it preferred that the UE 215a receiving the paging initiates a UE triggered Service Request procedure by sending a Service Request Message or similar to the eNB 213c, which in turn forwards the Service Request Message to the MME 211. In connection with the LTE system 200 it is preferred that the service request initiated by the UE 215a is done in accordance with the 3GPP specification TS 23.401-860 or similar, see e.g. Fig. 5.3.4.1-1 therein.

In a possible subsequent step S5a2 it preferred that the MME 211 replies by sending an Initial Context Setup Request or similar to the eNB 213c, which in turn establishes a radio bearer for the UE 215a in further subsequent step S5a3. The eNB 213c will then confirm the setup of the UE 215a radio bearer by sending an Initial Context Setup Complete or similar to the MME 211. In connection with the LTE system 200 it is preferred that steps S52-S54 is done in accordance with the 3GPP specification TS 23.401-860 or similar, see e.g. Fig. 5.3.4.1-1 therein.

In a sixth step S6a it is preferred that the prepared new bearer B-new is activated. This may e.g. be done by the MME 211 sending an Update Bearer Request message or similar to the co-located S-GW 212b, P-GW 214b instructing the S-GW 212b, P-GW 214b to activate the new bearer B-new previously setup.

As a result the co-located S-GW 212b, P-GW 214b will associate the new bearer B-new with the UE 215a so as to enable communication of user-data for the UE 215a between itself (S-GW 212b, P-GW 214b) and the UE 215a via the eNB 213c as illustrated by the fat solid arrow marked B-new in FIG. 2.

Generally, an association may e.g. done by binding the new bearer B-new to the IP address of the UE 215a with the effect that the communication of user-data for the UE 215a will be canalized via an IP tunnel from the co-located S-GW 212b, P-GW 214b to the UE 215a. Such an IP tunnel may e.g. be composed by several successive sub-tunnels.

The IP tunnel may e.g. be a GTP tunnel (GPRS Tunnelling Protocol) that has default endpoint addresses. The eNB 213c may e.g. identify the UE 215a from the radio bearer (i.e., tunnel on the air interface) so it will know which IP tunnel these packets should be forwarded uplink towards the co-located S-GW 212b, P-GW 214b. In turn, the co-located S-GW 212b, P-GW 214b may know from the incoming tunnel ID (TEID) which outgoing tunnel the given packet should take. So, the uplink path to the new co-located anchor S-GW 212b, P-GW 214b is basically secured the moment all tunnels in the network are setup/redirected in the correct way. This may be done in any well known manner, e.g. by means of various link protocols such as the above mentioned GTP. And the same is valid for the downlink path from the anchor co-located S-GW 212b, P-GW 214b to the UE 215a. It can be mentioned that the communication between a P-GW and a S-GW may e.g. be done via a GTP tullen as just mentioned, or via PMIP (Proxy Mobile IP).

Generally, the Update Bearer Request message may e.g. comprise information indicative of the identity UE-ID of the UE 215a and/or the identity B-new-ID of the new bearer B-new. The information enables the co-located S-GW 212b, P-GW 214b to identify the new bearer B-new and/or the UE 215.

More particularly, in connection with the LTE system 200 as shown in FIG. 2 it is preferred that the association is made in accordance with the 3GPP specification TS 23.401-860 or similar, see e.g. the Update Bearer Request message in Fig. 5.3.2.1-1 therein. Here, the Update Bearer Request may comprise one or several of: EPS Bearer Identity, eNB address, eNB TEID and/or Handover Indication. The abbreviations above are those generally used by the 3GPP, see e.g. the specification TR 21.905 V9.2.0 (2009-06). The association is preferably done by the co-located S-GW 212b, P-GW 214b creating a new entry in its EPS bearer context table for the new bearer B-new. The co-located S-GW 212b, P-GW 214b may also generate a Charging Id for the new bearer B-new. The new entry allows the co-located S-GW 212b, P-GW 214b to route user plane PDUs between the S-GW 212b and the PDN 218, and to start charging.

In a seventh step S7a it is preferred that the co-located S-GW 212b, P-GW 214b acknowledges by sending an Update Bearer Response message or similar to the MME 211 confirming that a new bearer B-new has been activated or will be activated shortly.

Generally, the Update Bearer Response message may e.g. comprise information indicative of the identity B-new-ID of the new bearer B-new and/or the identity UE-ID of the UE 215a. The information enables the MME 211 to identify the new bearer B-new and/or the UE 215.

More particularly, in connection with the LTE system 200 the response message to the MME 211 may, in addition to and/or as an alternative to the general information mentioned above, comprise the EPS Bearer Identity of the new bearer B-new.

In an eighth step S8a it is preferred that the UE 215a is configured in accordance with new IP address allocated for the UE 215a in step S1a1. The configuration may e.g. be done by the new co-located mobility anchor 212b, 214b sending a configuration message to the UE 215a. Preferably, the configuration message comprises information indicative of the new IP address allocated for the UE 215a in step S1a1. The configuration message may e.g. be a DHCP ForceRenew message as defined in the RFC 3202 specification. Preferably, the DHCP ForceRenew message at least comprises the IP address. It should be clarified that DHCP is an abbreviation of Dynamic Host Protocol and that the RFC 3202 specification is a document that is produced by the Internet Engineering Task Force (IETF), see e.g. www.ietf.org).

As a result applications run by the UE 215a may send the IP address as an identifier for enabling other external hosts or similar resources to initiate communication or similar for this IP address. In other words, the new IP address is typically needed for reaching the new co-located anchor 212b, 214b from the external world, e.g. from the PDN 218.

The first embodiment described above with reference to the LTE system in FIG. 2 and FIG. 3-4 applies mutatis mutandis with respect to the wireless communication system 100 in FIG. 1. Thus, in case the first embodiment is implemented in the system 100 it is evident that steps S1a-S8a (where applicable) applies mutatis mutandis to the Mobility Node Arrangement 111 (c.f. the MME 211), the Serving Node Arrangements 112a, 112b (c.f. S-GW 212a, 212b), the Mobility Anchor arrangements 114a, 114b (c.f. the P-GW 214a, P-GW 214b), the Mobile Terminal 115a (c.f. the UE 215a), the new user-data bearer (c.f. B-new) and the old user-data bearer Ld (c.f. B-old).

Function of a Packet System According to a Second Embodiment of the Invention

In a second embodiment of the present invention there is no requirement of the new S-GW 212b and the new P-GW 214b being co-located, as assumed in the first embodiment described above with reference to FIG. 3-4. In the second embodiment it is assumed that the MME 211 communicates with the new P-GW 214b being the new IP anchor for the UE 215a.

Figure 5:
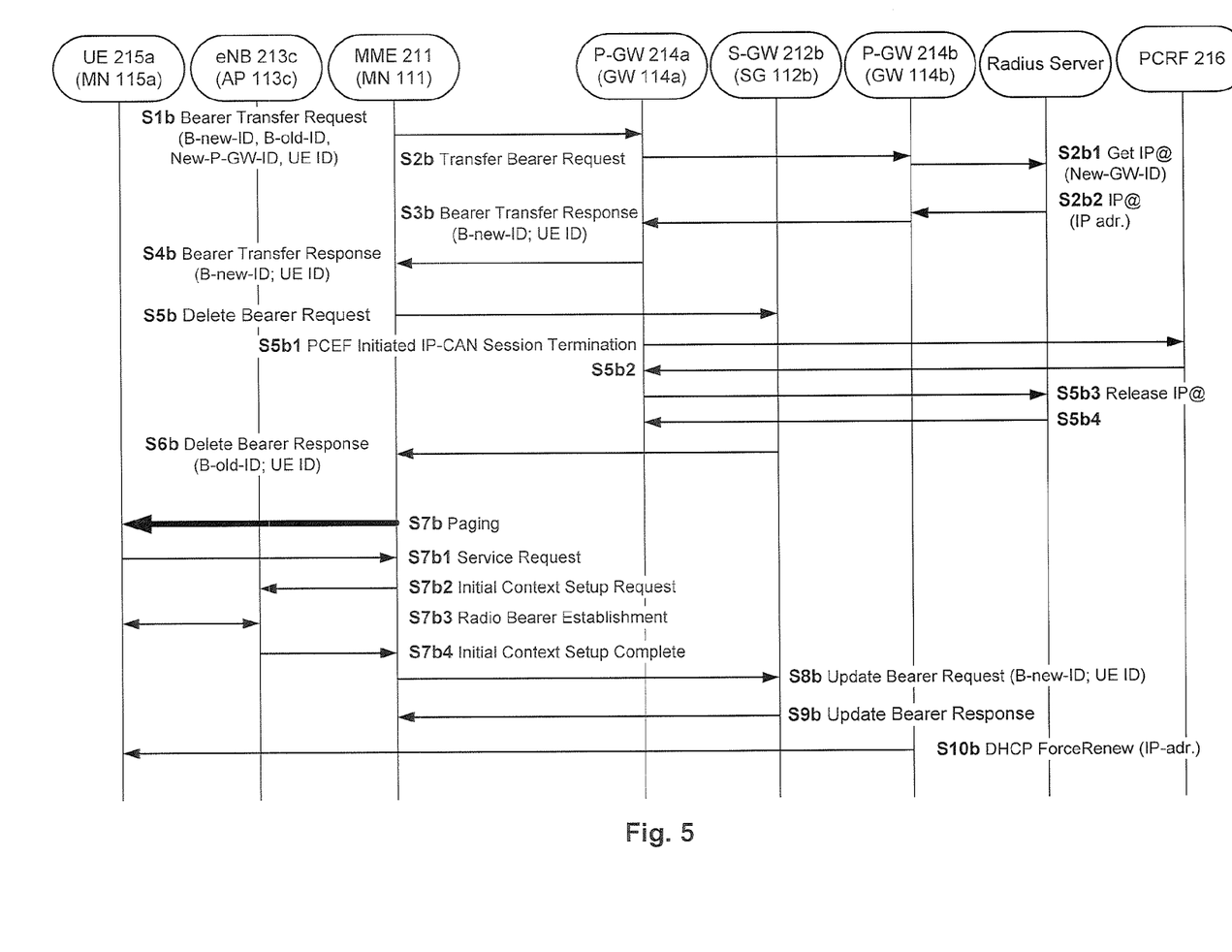
FIG. 5 is a schematic illustration of a sequence diagram illustrating the operational steps of a second embodiment of the present invention.
Figure 6:
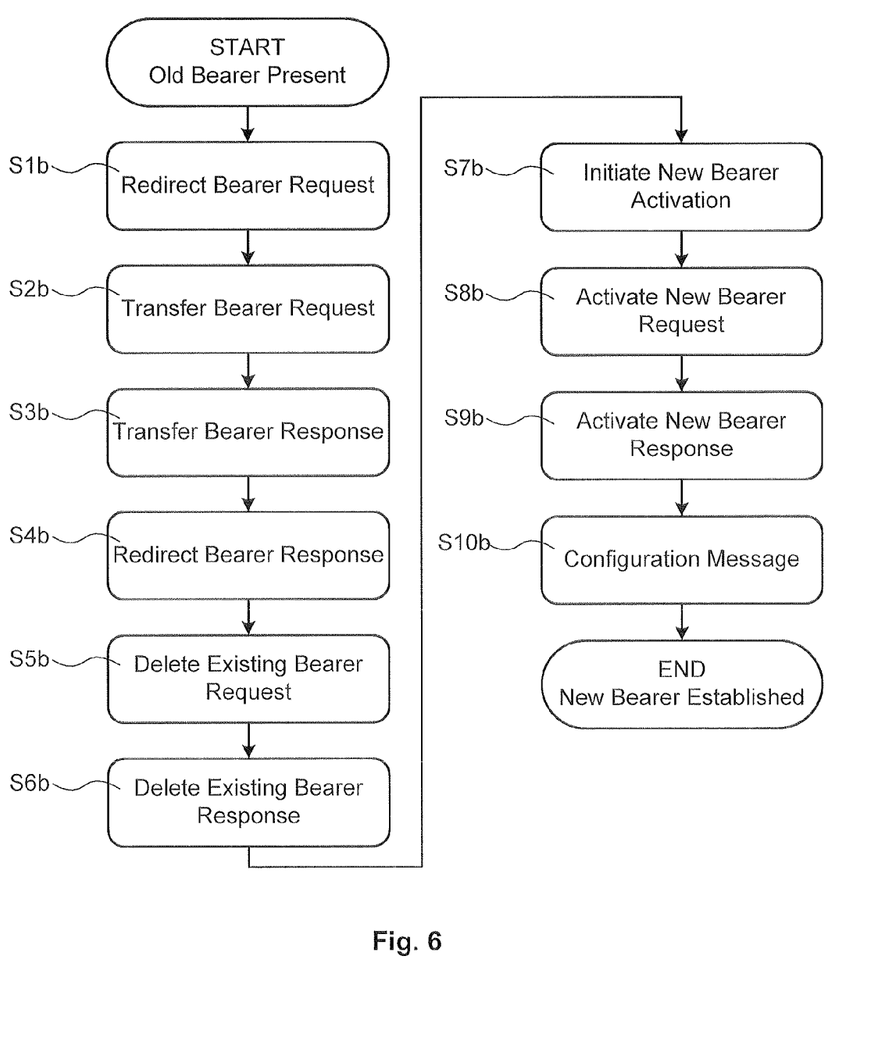
FIG. 6 is a flowchart illustrating the operational steps of the embodiment in FIG. 5.

In view of this the functions of the exemplifying LTE system 200 in FIG. 2 will now be described with reference to FIG. 5 showing a sequence diagram illustrating the operational steps of the second embodiment of the present invention, and with reference to FIG. 6 showing a flowchart illustrating the operational steps of the same second embodiment.

The functional steps of the second embodiment shown in FIGS. 5 and 6 correspond to the functional steps of the first embodiment shown in FIGS. 3 and 4 according to the following:

| $2^{nd}$ Embodiment | $1^{st}$ Embodiment |
|---|---|
| S1b | S1a |
| S2b | — |
| S2b1 | S1a1 |
| S2b2 | S1a1 |
| S3b | — |
| S4b | S2a |
| S5b | S3a |
| S5b1 | S3a1 |
| S5b2 | S3a2 |
| S5b3 | S3a3 |
| S5b4 | S3a4 |
| S6b | S4a |
| S7b | S5a |
| S7b1 | S5a1 |
| S7b2 | S5a2 |
| S7b3 | S5a3 |
| S7b4 | S5a4 |
| S8b | S6a |
| S9b | S7a |
| S10b | S8a |

The first step S1b in the second embodiment is essentially the same as the first step S1a in the first embodiment described above. Thus it is preferred that the MME 211 prepares a relocation of the IP anchor for the UE 215a under the same or similar conditions and in the same or similar manner as described in step S1a. However, in the second embodiment it is not assumed that the S-GW 212b and the P-GW 214b are co-located. On the contrary, the S-GW 212b and the P-GW 214b may be implemented as separate nodes or similar.

Thus, the preparation of anchor relocation for the UE 215a in step S1b is initiated by the MME 211 sending a request for initiating a relocation of mobility anchor for the UE 215a from the old anchor P-GW 214a to the new anchor P-GW 214b. More particularly, the preparation is preferably initiated by the MME 211 sending a prepare bearer request or similar for setting up a new bearer B-new for the UE 215a in the same or similar manner as in step S1a. The prepare bearer request may be seen as a request for redirecting the old bearer B-old, which e.g. may be a Bearer Transfer Request as illustrated in FIG. 5.

However, it should be noted that the new bearer B-new in step S1*b* is set up between the UE 215*a* and the new mobility anchor P-GW 214*b*, i.e. not between the UE 215*a* and a new anchor being a co-located S-GW 212*b*, P-GW 214*b* as in step S1*a*. Moreover, the prepare bearer request or similar in step S1*b* is preferably sent to the old P-GW 214*a*. In other words, in step S1*b* there is no prepare bearer request sent to a co-located S-GW 212*b*, P-GW 214*b*.

Generally, the prepare bearer request may e.g. comprise information indicative of at least one of: the identity B-new-ID of the new bearer B-new to be setup and/or the identity B-old-ID of the existing old bearer B-old to and/or the identity New-P-GW-ID of the new mobility anchor P-GW 214*b* (e.g. its IP address or similar), and/or the identity of the UE-ID of the UE 215*a* (e.g. its IP-address or similar) for which the anchor relocation is preformed. The information enables the old P-GW 214*a* to identify the new bearer B-new to be setup and/or the old bearer B-old to be replaced and/or the new P-GW 214*b* and/or the UE 215 and/or the new bearer B-new to be setup.

In a second step S2*b* it is preferred that the old mobility anchor P-GW 214*a* forwards the prepare bearer request or similar to the new mobility anchor P-GW 214*b*. The forwarded prepare bearer request may be seen as a forwarding of the request for redirecting the old bearer B-old. The forwarded request may e.g. be a Transfer Bearer Request as illustrated in FIG. 5.

The forwarded request may comprise one or several of the information items comprised by the prepare bearer request as described above. In addition, the old P-GW 214*a* may also transfer the bearer states for the old bearer B-old to the new mobility anchor P-GW 214*b*. The bearer states may e.g. include one or several of: the bearer policy and/or charging states, various counters, filters, firewall settings etc. Transferring the bearer states is particularly advantageous if dynamic bearer states are used. The transferred bearer states may then be obtained from the PCRF 216 at the subsequent establishment of a new bearer B-new for the UE 215*a* as will be further described in step S5*a*' below. It is preferred that the bearer states for the old bearer B-old is allocated to the new bearer B-new at the setup of the new bearer B-new by the new anchor P-GW 214*b*.

In the subsequent steps S2*b*1-S2*b*2 it is preferred that the new anchor P-GW 214*b* allocates a new IP address or similar to be used by the UE 215*a*. The allocation of a new IP address in steps S2*b*1-S2*b*2 may e.g. be done by means of a Radius server or otherwise in the same or similar manner as described above with reference to steps S1*a*1-S1*a*2. The UE 215*a* is provided with the new allocated IP address as described in step S8*a* above. However, in this embodiment the IP address may be the same IP address as the one that was used by the UE 215*a* before the anchor relocation was initiated in Step S1*b*. This IP address may e.g. be provided to the new mobility anchor 214*b* from the old mobility anchor 214*a* in step S1*a*1 above, i.e. steps S2*b*1 and S2*b*2 are not performed or the result there from is ignored by the new mobility anchor 214*b*.

In a third step S3*a* it is preferred that the new anchor P-GW 214*b* sends a prepare bearer response message or similar to the old anchor P-GW 214*a* confirming that a new bearer B-new has been setup or will be setup shortly. The prepare bearer response may e.g. be a Bearer Transfer Response as illustrated in FIG. 5. Generally, the create bearer response message may e.g. comprise information indicative of the identity UE-ID of the UE 215*a* and/or the identity B-new-ID of the new bearer B-new. The information enables the MME 211 to identify the new bearer B-new and/or the UE 215.

In a fourth step S4*b* it is preferred that the old mobility anchor P-GW 214*a* forwards the received prepare bearer response or similar to the MME 211. The forwarded response in step S4*b* may comprise one or several of the information items comprised by the response in step S3*b*.

The execution of the above steps S1*b*, S2*b*, S3*b* and S4*b*—possibly including the subsequent steps S2*b*1-S2*b*2—means that the properties of the new bearer B-new have been setup so as to enable a future communication of user-data between the UE 215*a* and the new anchor P-GW 214*b* once the new bearer B-new has been activated. The setup of the new bearer B-new is done without affecting the communication of user-data for the UE 215*a* via the old bearer B-old. As already described in connection with the first embodiment above, this means that a lesser amount of relocation signalling is left that may affect the communication of user-data, which e.g. implies that the outage time for the UE 215*a* can be kept to a minimum. In addition, the new bearer B-new may be prepared as a precautionary measure, e.g. in case tromboning may be expected. The MME 211 may then wait for a suitable occasion to relocate from the old bearer B-old to the new bearer B-new. In fact, the P-GW 214*b* will be a new standby mobility anchor for the UE 215*a* with a new bearer B-new setup for the UE 215*a* ready to be activated once the existing bearer B-old is removed (e.g. deleted), thus phasing out the existing mobility anchor 214*a*.

Since the old bearer B-old still exists and user-data for the UE 215*a* is still communicated via this bearer, a relocation of the IP anchor and the communication paths for the UE 215*a* requires that the old bearer B-old is deleted before the new bearer B-new can be activated.

Hence, a deletion of the old bearer B-old is done according to steps S5*b* and S6*b*, with addition of the possible subsequent steps S5*b*1-S5*b*4. The activation of the new bearer B-new for communicating user-data will then occur in steps S8*b*-S10*b*. The steps now mentioned are preformed mutatis mutandis as the corresponding steps described in connection with the first embodiment and as correlated in the table above. However, the request in step S5*b* is sent by the MME 211 to the S-GW 212*b* and the response in step S6*b* is sent by the S-GW 212*b* to the MME 211.

Steps S8*b* and S9*b* and S10*b* are executed in the same or similar manner as steps S6*a*, S7*a* and S8*a* respectively (c.f. the table above). However, the Update Bearer Request is sent to the S-GW 212*b* and the Update Bearer Response is sent from the S-GW 212*b*. In turn the S-GW 212*b* may communicate with the new mobility anchor 214*b* so as to update the properties of the new bearer B-new. Moreover, step S10*b* is sent from the new mobility anchor P-GW 214*b*.

The second embodiment described above with reference to the LTE system in FIG. 2 applies mutatis mutandis with respect to the wireless communication system 100 in FIG. 1. Thus, in case the second embodiment is implemented in the system 100 it is evident that steps S1*b*-S10*b* (where applicable) applies mutatis mutandis to the Mobility Node Arrangement 111 (c.f. the MME 211), the Serving Node Arrangements 112*a*, 112*b* (c.f. S-GW 212*a*, 212*b*), the Mobility Anchor arrangements 114*a*, 114*b* (c.f. the P-GW 214*a*, P-GW 214*b*), the Mobile Terminal 115*a* (c.f. the UE 215*a*), the new user-data bearer (c.f. B-new) and the old user-data bearer Ld (c.f. B-old).

The present invention has now been described with reference to exemplifying embodiments. However, the invention is not limited to the embodiments described herein. On the contrary, the full extent of the invention is only determined by the scope of the appended claims.

The invention claimed is:

1. A method, performed in a new mobility anchor, for relocating a mobility anchor for a mobile terminal in a wireless communication system comprising:
   receiving, from either a Mobility Management Entity (MME) or Mobile Switching Center (MSC), a request for redirecting an old bearer configured to communicate user-data between the mobile terminal and an old mobility anchor;
   setting up a new standby bearer configured to operatively communicate user-data between the mobile terminal and the new mobility anchor, and ready to be activated once the old bearer is deleted;
   refraining from activating the new bearer until deletion of the old bearer;
   thereafter and in response to deletion of the old bearer, activating the new bearer.

2. The method according to claim 1, further comprising:
   receiving, from the MME or MSC, a request for activating the new bearer; and
   associating the new bearer with the mobile terminal.

3. The method according to claim 1, wherein the old bearer and the new bearer are default bearers.

4. The method according to claim 1, wherein the new bearer is set up while the old bearer is actively communicating user-data to the mobile terminal.

5. The method according to claim 2, wherein:
   the redirecting request from the MME or MSC comprises at least one of:
      a first parameter identifying the new mobility anchor;
      a second parameter identifying the old bearer;
      a third parameter identifying the new bearer; and
      a fourth parameter identifying the mobile terminal;
   the activating request from the mobile node comprises at least one of:
      the third parameter identifying the new bearer; and
      the fourth parameter identifying the mobile terminal.

6. The method according to claim 1, further comprising:
   receiving from the old mobility anchor bearer states for the old bearer; and
   setting up the bearer states for the new bearer so as to be substantially the same as the bearer states for the old bearer.

7. A new mobility anchor comprising:
   one or more processing circuits configured to:
      communicate user-data of a mobile terminal;
      receive, from either a Mobility Management Entity (MME) or Mobile Switching Center (MSC), a request for redirecting an old bearer configured to communicate user-data between the mobile terminal and an old mobility anchor;
      set up a new standby bearer configured to operatively communicate user-data between the mobile terminal and the new mobility anchor, and ready to be activated once the old bearer is deleted;
      refrain from activating the new bearer until deletion of the old bearer;
      thereafter and in response to deletion of the old bearer, activate the new bearer.

8. The new mobility anchor according to claim 7, wherein the one or more processing circuits are further configured to:
   receive from the MME or MSC a request for activating the new bearer; and
   associate the new bearer with the mobile terminal.

9. The new mobility anchor according to claim 7, wherein the one or more processing circuits are further configured to send a configuration message to the mobile terminal comprising information indicative of a new IP address for the mobile terminal.

10. The new mobility anchor according to claim 7, wherein the one or more processing circuits are further configured to:
    receive from the old mobility anchor bearer states for the old bearer; and
    set up the bearer states for the new bearer so as to be substantially the same as the bearer states for the old bearer.

11. A mobility node comprising:
    one or more processing circuits configured to:
       manage bearers for a mobile terminal;
       transmit a request for relocation of mobility anchor for the mobile terminal from an old mobility anchor to a new mobility anchor so as to enable the set up of a new standby bearer configured to operatively communicate user-data between the mobile terminal and the new mobility anchor, and ready to be activated once the old bearer is deleted;
       in response to deletion of the old bearer, transmit a further request to activate the new bearer;
       wherein the mobility node is either a Mobility Management Entity (MME) or Mobile Switching Center (MSC).

12. The mobility node according to claim 11, wherein the one or more processing circuits are further configured to:
    transmit a request for deleting an old bearer configured to operatively communicate user-data between the mobile terminal and the old mobility anchor; and
    wherein the further request enables an association of the new bearer with the mobile terminal.

13. The mobility node according to claim 12, wherein the one or more processing circuits are further configured to transmit the request for deletion when the mobile terminal is more locally positioned with respect to the new mobility anchor than with respect to the old mobility node.

14. The mobility node according to claim 11, wherein the one or more processing circuits are further configured to transmit the request for relocation while the old bearer is actively communicating user-data to the mobile terminal.

15. The mobility node according to claim 11, wherein the request for relocation comprises at least one of:
    a first parameter identifying the new bearer;
    a second parameter identifying the old bearer;
    a third parameter identifying the new mobility anchor; and
    a fourth parameter identifying the mobile terminal.

16. The mobility node according to claim 11, wherein the one or more processing circuits are further configured to withhold a request for activating the new bearer until there is no service actively communicating user-data for the mobile terminal.

* * * * *